United States Patent

[11] 3,622,873

[72] Inventors Jonathan E. Stine
Wayne;
Lewis L. Tanguy, Jr., Paoli, both of Pa.

[21] Appl. No. 6,077
[22] Filed Jan. 27, 1970
[45] Patented Nov. 23, 1971
[73] Assignee Burroughs Corporation
Detroit, Mich.

[54] THIN MAGNETIC FILM MAGNETOMETER FOR PROVIDING INDEPENDENT RESPONSES FROM TWO ORTHOGONAL AXES
16 Claims, 12 Drawing Figs.

[52] U.S. Cl. .......... 324/43 R, 340/174 TF
[51] Int. Cl. .......... G01r 33/02
[50] Field of Search .......... 324/43, 47; 340/174 TF

[56] References Cited
UNITED STATES PATENTS
3,416,072 12/1968 Fussell et al. .......... 324/43 R
3,443,213 5/1969 Bader et al. .......... 324/43 R

*Primary Examiner*—Rudolph V. Rolinec
*Assistant Examiner*—R. J. Corcoran
*Attorney*—Carl Fissell, Jr.

ABSTRACT: A magnetic feedback technique is described for use with a magnetometer sensor employing a thin magnetic film transducer in an inductance-variation mode to separate and isolate the easy axis and hard axis responses of the transducer, and to provide independent easy axis and/or hard axis output signals from the magnetometer.

INVENTORS.
JONATHAN E. STINE
LEWIS L. TANGUY JR.
BY Francis A. Varallo
AGENT

INVENTORS.
JONATHAN E. STINE
LEWIS L. TANGUY JR.
BY
Francis A. Varallo
AGENT

INVENTORS
JONATHAN E. STINE
LEWIS L. TANGUY JR.
BY
Francis A. Varallo
AGENT

THIN MAGNETIC FILM MAGNETOMETER FOR PROVIDING INDEPENDENT RESPONSES FROM TWO ORTHOGONAL AXES

CROSS-REFERENCES TO RELATED APPLICATIONS

Although not limited thereto, the present technique may be applied to the thin film magnetometers described and claimed in the following application: (1) Ser. No. 449,183, which is U.S. Pat. No. 3,416,072, "Thin Film Magnetometer Employing Phase Shift Discrimination," by Richard L. Fussell and Clifford J. Bader, and (2) Ser. No. 543,097, now U.S. Pat. No. 3,443,213, "Magnetometer Using Thin Film Transducer as Slope Detection Filter," by Clifford J. Bader, Richard L. Fussell and Arthur G. Barnett, and (3) Ser. No. 691,901, now U.S. Pat. No. 3,518,234 "Magnetometer Employing Dual Thin Magnetic Film Transducers," by Clifford J. Bader. Each of these applications is assigned to the same assignee as the present application.

BACKGROUND OF THE INVENTION

As taught and claimed in the referenced applications, the basic ferromagnetic thin film magnetometers offer the advantages of simplicity, mechanical ruggedness, compactness and sensitivity with minimal power consumption for operation. For special magnetometer applications requiring absolute accuracy, linearity and minimal temperature and supply voltage dependence, the thin film transducer may be subjected to a fixed-magnitude bias field and magnetic feedback, both being directed along its easy or preferred axis of magnetization. The sensitivity of the transducer to an external magnetic field environment directed along the film easy axis is therefore stable and predictable. However, the transducer is responsive to the square of the external magnetic field appearing along the film hard axis. In such special applications, the hard axis sensitivity is detrimental because the easy axis output of the magnetometer includes the transducer response to the hard axis magnetic environment.

The present circuit technique, when applied to magnetometers of the type described in the referenced applications, provides for the elimination or substantial reduction of the transducer hard axis sensitivity. At the same time, the present hard axis sensitivity reduction technique transforms the referenced thin film magnetometers into orthogonal two-axis sensors with a high order of separation and isolation between the responses of the two axes as measured at the respective output terminals.

SUMMARY OF THE INVENTION

In accordance with the present invention, the hard axis sensitivity of the transducer is reduced through the use of negative feedback directed along the thin film hard axis of magnetization. The technique, which relies upon the substantially square law response of transducer inductance to hard axis magnetic field components, employs a magnetic chopping field applied to the thin film along the hard axis to produce a transducer output signal containing hard axis field amplitude and direction information along with the usual easy axis information. Thus, the transducer output exhibits a differential change between the opposite phases of the hard axis chopper field peak amplitudes. The hard and easy axis information is separated respectively into easy axis and hard axis channels. In the latter, the chopper field phases are synchronously detected, and a signal, which represents the difference in the output levels between the phases is produced at the detector output terminal. The detector output signal is a linear function of the external applied hard axis field component. This signal may be employed in conjunction with hard axis feedback coils to generate a hard axis field of proper magnitude and polarity to effectively null out or cancel the external hard axis field component. In this manner, the undesired effect of the applied hard axis field on the transducer is effectively reduced or eliminated.

DESCRIPTION OF THE PREFERRED EMBODIMENT

Figure 1:
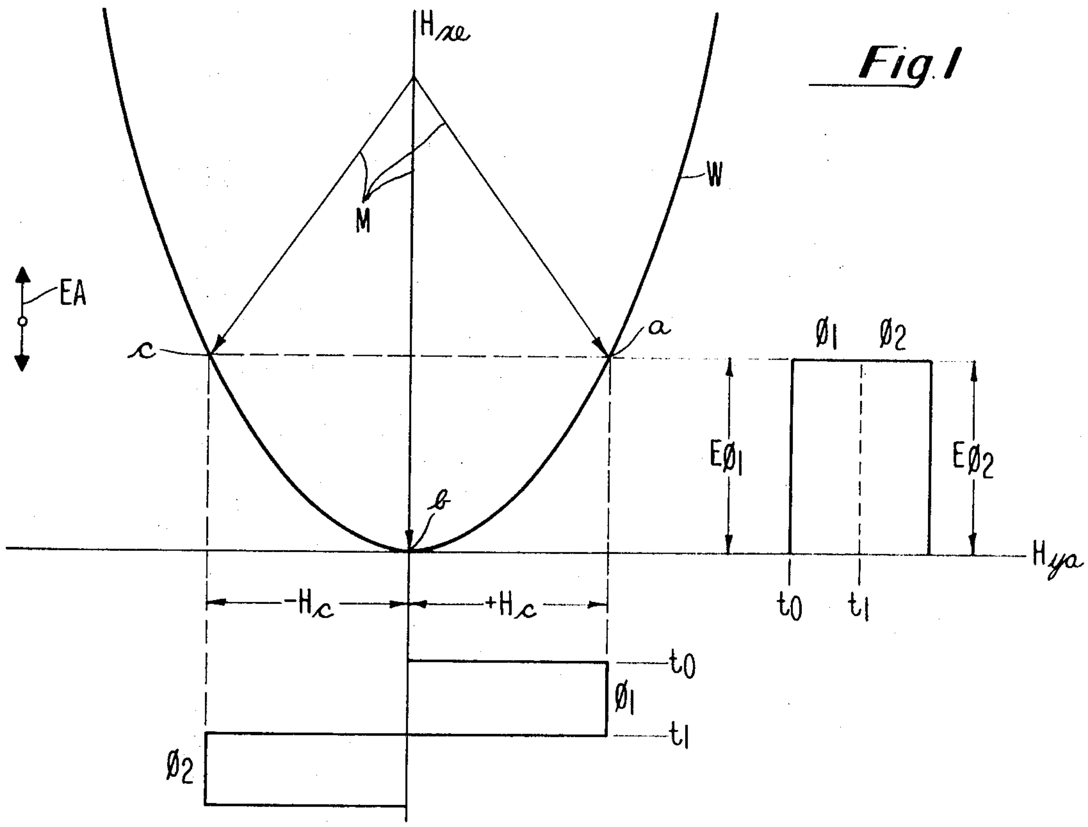
FIG. 1 illustrates graphically the thin magnetic film transducer response to the hard axis chopper field, together with the corresponding physical movement of the magnetization (M) vector of the thin film.

Before proceeding with a detailed description of the magnetometer system of the present invention it will be helpful to consider the square law response of the thin film transducer to hard axis signals. Although higher order dependencies are present in the hard axis response, the dominant one is the square law, and it is this characterization of the response which is used herein. It should be noted that while the invention has general utility in the basic magnetometer configuration which does not include easy axis bias and feedback, its use is particularly advantageous in those sensing applications requiring such refinements. For this reason, the analysis and description which follows assumes that the magnetometer system is of the latter variety. With easy axis magnetic bias and negative feedback, the thin film transducer response to easy axis signals may be represented as small excursions along a substantially straight line. On the other hand, the response of the transducer to hard axis signals is indicated in FIG. 1 by the curve "W." The axis labeled $H_{ya}$ represents the externally applied hard axis field in oersteds; the $H_{xe}$ axis, the equivalent easy axis signal to produce the same response to a given hard axis signal. Thus, a hard axis signal $H_{ya}$ applied to the film changes the film contributed inductance by an incremental amount. In accordance with the assumed easy axis feedback, the transducer response to the change produces an error signal input into the feedback path which causes an equivalent easy axis field, $H_{xe}$, to be applied to the film. This last mentioned field is of the proper magnitude and direction to cancel the incremental inductance change, and to restore the system to its original operating point. The response of the transducer to hard axis fields may be expressed mathematically as $$H_{xe}=RH_{ya}^2 \text{ where } \quad (1)$$

$R$ is a function of the easy axis magnetic bias $H_B$ and the thin film anisotropy field, $H_K$ as follows $$R=\frac{3}{2}\frac{H_B}{H_K^2}\frac{1}{\left(1+\frac{H_B}{H_K}\right)^2} \quad (2)$$

Examination of this last expression reveals that the hard axis sensitivity $H_{xe}$ is minimized when $H_B$ is a minimum and $H_K$, a maximum.

As pointed out hereinbefore, hard axis response in a magnetometer system designed to provide extremely accurate easy axis response, is unwanted, and must be reduced or eliminated. The following description of the present invention will reveal how this is accomplished.

With further reference to FIG. 1, symmetrical chopping signals having a square or rectangular waveshape are illustrated as generating hard axis chopper fields of peak amplitudes $+H_c$, $-H_c$ for the respective phases $\Phi_1$ and $\Phi_2$. It is assumed in FIG. 1 that the external magnetic field environment does not contain any hard axis field components. The output of the transducer under these conditions for the two phases is illustrated by the voltage levels $E_{\phi_1}$, $E_{\phi_2}$ corresponding in time to the peak amplitude of the chopper pulses $+H_c$ and $-H_c$ for phases $\Phi_1$ and $\Phi_2$. The dashed line between the pulses indicates the transient condition where the transducer output fluctuates rapidly as the chopper field changes from its peak value in one direction to its peak in the opposite direction. Thus, at time $t_1$, ideally the output of the transducer decreases instantaneously in accordance with the response curve from point "$a$" to point "$b$," and then increases instantaneously in value from "$b$" to "$c$". This occurs in response to the transition of the chopper field from $+H_c$ in $\Phi_1$ to $-H_c$ in $\Phi_2$.

FIG. 1 also illustrates the physical movement of the M vector. Initially the M vector lies parallel with the thin film easy axis designated EA, touching point "$b$" on the response curve. As the chopper field $+H_c$ is applied at time $t_0$, the vector moves from "$b$" to "$a$" and remains at this position for $\Phi_1$. The transducer output reflects this change. The peak-to-peak amplitude of the $E_{\phi_1}$ output pulse corresponds to an increase in amplitude measured from the $H_{yu}$ axis which is a reference line touching point "$b$" of the curve, to a new level corresponding to "$a$" on the curve. At time $t_1$, the chopper field shifts from $+H_c$ to $-H_c$ and the M vector swings from "$a$" to "$b$" and then to "$c$." The output level $E_{\phi_2}$ at point "$c$" on the curve for $\Phi_2$ is identical to that at point "$a$" for $\Phi_1$.

If the $E_{\phi_1}$ and $E_{\phi_2}$ outputs of the transducer under the conditions of FIG. 1 are synchronously detected, the detector AC output level would be substantially zero, indicating that no difference exists in the output between the phases. This, in turn represents the operation of the transducer in a magnetic field environment where no hard axis components are present.

Figure 2:
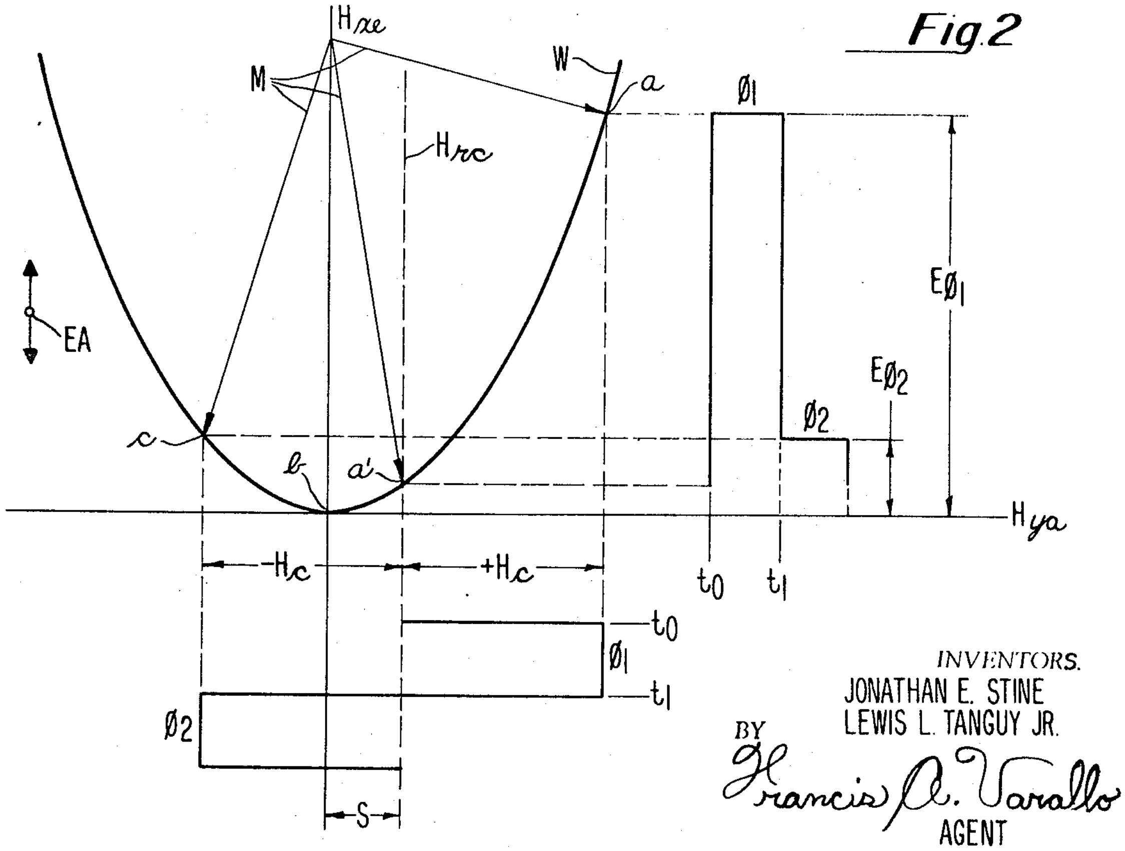
FIG. 2 depicts the effect on the thin film transducer response and the M vector movement of a hard axis magnetic field environment superimposed upon the hard axis chopper field of FIG. 1.

FIG. 2 illustrates the effect on the transducer response of a hard axis field component, "S," superimposed on the hard axis chopper field. It is observed that the field, "S," shifts the entire response curve "W" with respect to the reference line $H_{rr}$ of the chopper field. In FIG. 2, the polarity of the field component "S" is such that the curve is shifted to the left — the $H_{xr}$ axis being displaced from the reference axis $H_{rr}$ by the magnitude of the "S" field. As in FIG. 1, the outputs of the transducer are designated $E_{\phi_1}$ and $E_{\phi_2}$ occuring respectively for the $+H_c$ and $-H_c$ peak chopper field conditions. Unlike FIG. 1, it will be apparent that the output levels are not the same. As $+H_c$ is applied to the film at time $t_0$, the output rises to the $E_{\phi_1}$ level, in accordance with the path "$a'$" to "$a$" along the curve and remains at this level during $+H_c$. In the transition to the succeeding phase $\Phi_2$ at time $t_1$, the output drops from "a" through "$a$."" to "$b$," and then rises to point "$c$". This produces a $E_{\phi_2}$ output level while $-H_c$ is present. In contrast to FIG. 1, the M vector reference position in FIG. 2 is not parallel with the easy axis, EA, and that the output now exhibits a differential change between the $+H_c$ and $-H_c$ phases as a function of the hard axis response.

It is apparent that under the field conditions of FIG. 2, the output pulse sequence generated by the chopper field is a high level $E_{\phi_1}$ signal followed by a low level $E_{\phi_2}$ signal. If a hard axis field of the same magnitude as the "S" field of FIG. 2 had been applied in the opposite direction, the response curve would have also been shifted in a direction opposite to that depicted. The output pulse level sequence would have been reversed, that is, a low level $E_{\phi_1}$ signal would have been followed by a high level $E_{\phi_2}$ signal.

Summarizing, the difference in amplitude between the two successive outputs is proportional to the ambient hard axis field strength. The phase relationship between the high-low pulse sequence and the chopper field is dependent upon the direction or polarity of the hard axis field. In accordance with the present invention the transducer outputs may be synchronously detected and a signal, corresponding to the difference in the output pulse sequence levels and indicative of the direction of the hard axis field, will be produced at the detector output.

As will become apparent from the following description, the detector output signal which has a linear dependence on the applied hard axis field, may be used to generate a correction hard axis field to cancel the applied field. In this manner, the effect of the hard axis field on the transducer will be greatly reduced, if not eliminated.

With the aid of FIG. 2 the mathematical chopper transfer function may be developed.

Starting with equation (3) which expresses the relationship of hard axis signals to equivalent easy axis signals $$H_{xe}=RH_{yu}^2, \quad (3)$$

where "$R$" has been defined in equation (2) and substituting the hard axis field $$H_{yu}=S\pm H_c \quad (4)$$

where "S" is a given external hard axis field as shown for example in FIG. 2 and determining the output for each phase of the chopper $$H_{xe}^{\phi_1}=R(S+H_c)^2 \quad (5)$$

for the first phase $$H_{xe}^{\phi_2}=R(S-H_c)^2 \quad (6)$$

for the second phase, and then expanding, the following is obtained $$H_{xe}^{\phi_1}=R(S^2+2SH_c+H_c^2) \quad (7)$$

and $$H_{xe}^{\phi_2}=R(S^2-2SH_c+H_c^2) \quad (8)$$

Since the modulated chopper signal is phase detected and the two outputs thus obtained appear differentially, the output $H_{xed}$ is $$H_{xed}=H_{xe}^{\phi_1}-H_{xe}^{\phi_2}=R[2SH_c-(-2SH_c)]H_{xed}=R(4H_c)S \quad (9)$$

This last expression indicates that a linear transfer function between hard axis signals and the equivalent easy axis output has been obtained.

Examination of FIG. 1 reveals that in addition to the last mentioned output, a low frequency component of easy axis signal has been introduced by the chopper field. The magnitude of this signal may be expressed as follows:

$$H_{xe}=\frac{H_{xe}^{\phi_1}-H_{xe}^{\phi_2}}{2}+H_{xe}^{\phi_2},$$

substituting from equation (4)

$$H_{xe}=R\left[\frac{(S+H_c)^2-(S-H_c)^2}{2}+(S-H_c)^2\right]= R(S^2+H_c^2)H_{xe}=R(S^2)+R(H_c^2) \quad (10)$$

The first term is the normal transducer response to hard axis signals and the second term is the DC term produced by the chopper. In practice, the second term presents no problem since it represents a constant and predictable quantity.

The chopper field considered in connection with FIGS. 1 and 2 was generated by a current pulse having a square or rectangular waveshape. As compared for example, with a triangular waveshape, the square pulse has certain advantages. In the absence of a hard axis field environment, the triangular waveform introduces a chopper component with magnitude $H_c$ into the easy axis channel at chopper frequency. Ideally, the square pulse introduces no such component. Moreover, in contrast to the square pulse, the triangular wave requires a special narrow-width sampling gate with attendant generation and delay problems, thereby increasing circuit complexity.

Figure 3:
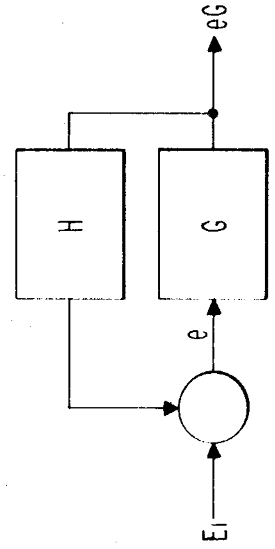
FIG. 3 is a block diagram of a generalized feedback network applicable to the present sensor system.

With reference to FIG. 3, the reduction in system hard axis sensitivity obtained from the chopper-type hard axis feedback technique may be determined as follows.

Inspection of FIG. 3 reveals that the error signal input "$e$" to the amplifier with the feedback loop closed is $$e=E_i-GHe \quad (11)$$

which may be rewritten $$e=\frac{E_i}{1+GH} \quad (12)$$

Without feedback, the error voltage is $$e=E_i \quad (13)$$

The reduction in error signal due to the feedback is the ratio of the two cases and is $$\frac{e\text{ (with feedback)}}{e\text{ (without feedback)}}=\frac{\frac{E_i}{1+GH}}{E_i}=\frac{1}{1+GH} \quad (14)$$

$$\frac{e\text{ (with feedback)}}{e\text{ (without feedback)}}=\frac{1}{GH} \quad (15)$$

Therefore in the present system, the signal appearing on the transducer hard axis with the feedback connected is the hard axis field reduced by 1/GH.

Figure 4:
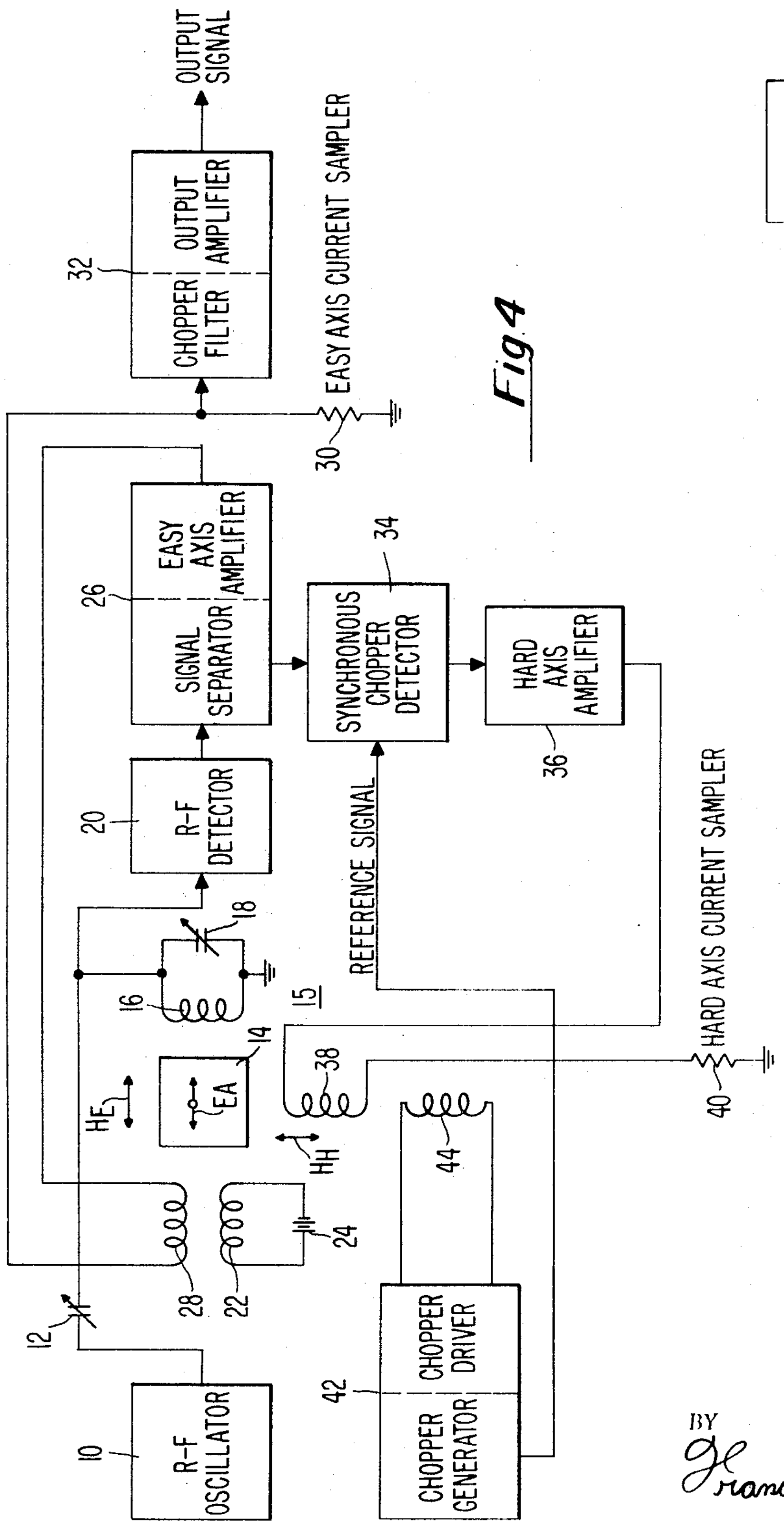
FIG. 4 is a detailed diagram of a sensitive easy axis magnetometer system employing the hard axis sensitivity reduction technique of the present invention.

FIG. 4 illustrates a complete magnetometer system incorporating chopper-type hard axis feedback. For ease of description the system has been divided into an easy axis channel and a hard axis channel, illustrated respectively in FIGS. 5 and 6. Thus each of the latter FIGURES has been drawn from the system block diagram of FIG. 4 to include only those components of the respective channels illustrated thereby.

Figure 5:
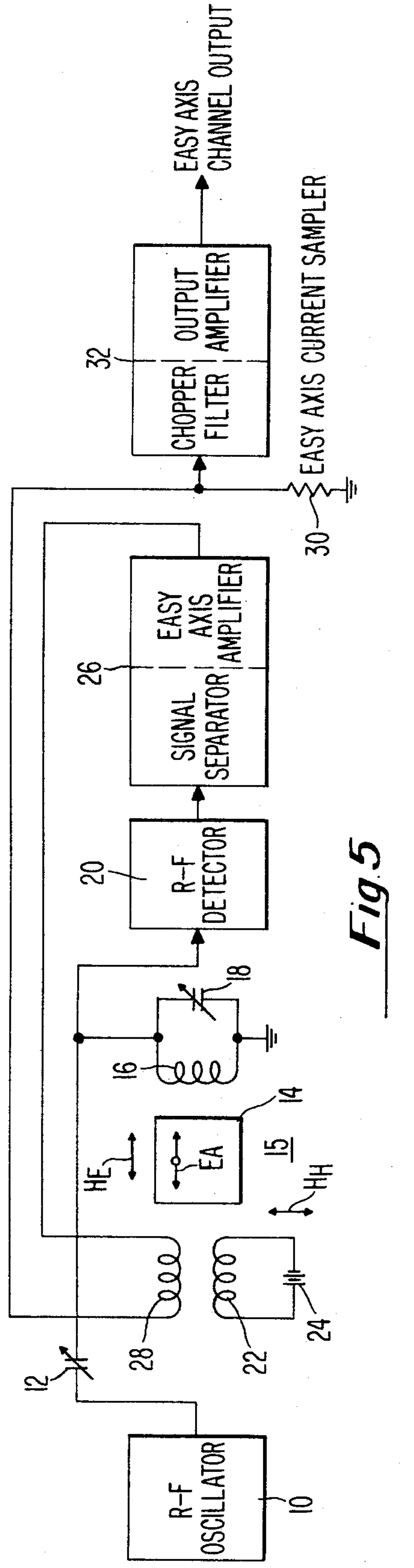
FIG. 5 depicts those components of FIG. 4 which comprise an easy axis channel.

The easy axis channel of FIG. 5 comprises two separate feedback controlled circuits. The first of these is the broadband magnetometer sensor itself and the second is the easy axis Chopper Filter/Output Amplifier 32 which shapes the passband and provides signal gain as required.

As noted hereinbefore, the present invention incorporates a basic sensor of the inductance-variation type, examples of which are found in the referenced applications. FIG. 5 illustrates the components of the slope-detection magnetometer described and claimed in the U.S. Pat. No. 3,443,213. A general review of the characteristics of the referenced inductance variation magnetometers, and in particular, the slope-detection configuration is believed helpful to the reader at this time.

The thin film inductance-variation magnetometer uses a winding or coil inductively coupled to a thin magnetic film, as the inductive element in a tuned tank circuit. The film is oriented with respect to the coil such that the film hard axis of magnetization coincides with the coil axis. The small signal inductance of such a winding depends upon the amount of coherent film-flux rotation produced by a given coil current. The presence of an external, easy-axis field constrains or enhances this rotation depending on its sense or polarity relative to the film magnetization sense. Thus, the inductance varies monotonically with easy axis fields not exceeding the film switching threshold.

In operation, the thin film magnetization is subjected to carefully controlled perturbations which are incapable of reversing or switching the magnetization state. Because of this, both the drive requirements and the inherent noise level are very low. In order to obtain induced voltages with reasonable amplitudes in spite of the extremely small flux changes available, the inductance-variation transducer is generally operated at radio frequencies.

In FIG. 5 the sensor utilizes an RF Oscillator 10 which may be of the Pierce or Colpitts configuration, loosely coupled to the transducer tank circuit by way of small variable capacitor 12. This capacitor offers relatively high reactance at the oscillator frequency and tends to provide a constant current drive. The transducer tank circuit includes a thin magnetic film 14 having its easy or preferred axis oriented parallel with the double headed arrow designated EA. The tank circuit also includes a capacitor 18 and an RF inductor 16 wound about the film and having its coil axis oriented transverse to the easy axis. The arrows labeled $H_E$ and $H_H$ indicate respectively the directions of external magnetic field components directed along the thin film easy and hard axes. The transducer tank circuit is tuned so that the oscillator frequency falls on the slope of the resonance curve. As the transducer inductance varies with the external applied fields, the tuning point shifts and the voltage developed across the tank varies proportionately. The frequency of the signal appearing on the tank circuit is the same as that of the oscillator, typically in the 10 mHz. region. An RF Detector 20, which may include a transistor connected as an emitter follower, converts the RF tank signal to an equivalent DC voltage appearing at the output thereof.

It should be noted that if the applied easy direction field, $H_E$, exceeds the film coercive force, $H_C$, and has a sense opposing that of the film magnetization, the film will be demagnetized or have its magnetization sense reversed. The basic magnetometer may be made nonvolatile and the dynamic range greatly increased by the addition of an easy axis biasing field. The constant bias field may be provided in various ways. FIGS. 4 and 5 illustrate schematically a field coil 22 and current source 24 which in practice may include a winding wrapped around the transducer assembly, carrying a constant current, and oriented to provide magnetic flux in the film easy direction. Alternately, the bias field may be provided by permanent magnets.

Continuing with the description of the signal flow in the easy axis channel of FIG. 5, the output of the RF Detector 20 is applied to the Signal Separator/Easy Axis Amplifier 26. The Separator in turn supplies only the easy axis signal frequencies (from DC to approximately 10 kHz.) to the succeeding Easy Axis Amplifier stages. This last amplifier may be of the conventional operational variety.

The signal output of the Easy Axis Amplifier portion of block 26 is applied to the easy axis feedback network which comprises in series an easy axis feedback coil 28 and a current sampling resistor 30. The feedback coil 28 is a solenoid having its axis oriented parallel to the thin film easy axis, EA, and is positioned with respect to the film so as to apply the negative magnetic feedback required to null the sensed external easy axis field components. The amplitude and polarity of the voltage developed across the sampling resistor 30 as a result of the feedback current flow is a measure of the strength and direction of the sensed external field.

In the easy axis channel of FIG. 5, the sensor voltage appearing across the resistor 30 is applied to the Chopper Filter/Output Amplifier 32. This Filter may conveniently consist of two cascaded LC low pass filters designed to greatly attenuate the chopper component in the easy axis output signal. The Chopper Filter output is then amplified in the easy axis Output Amplifier which shapes the system passband, provides signal gain, and a low impedance easy axis channel output.

Figure 6:
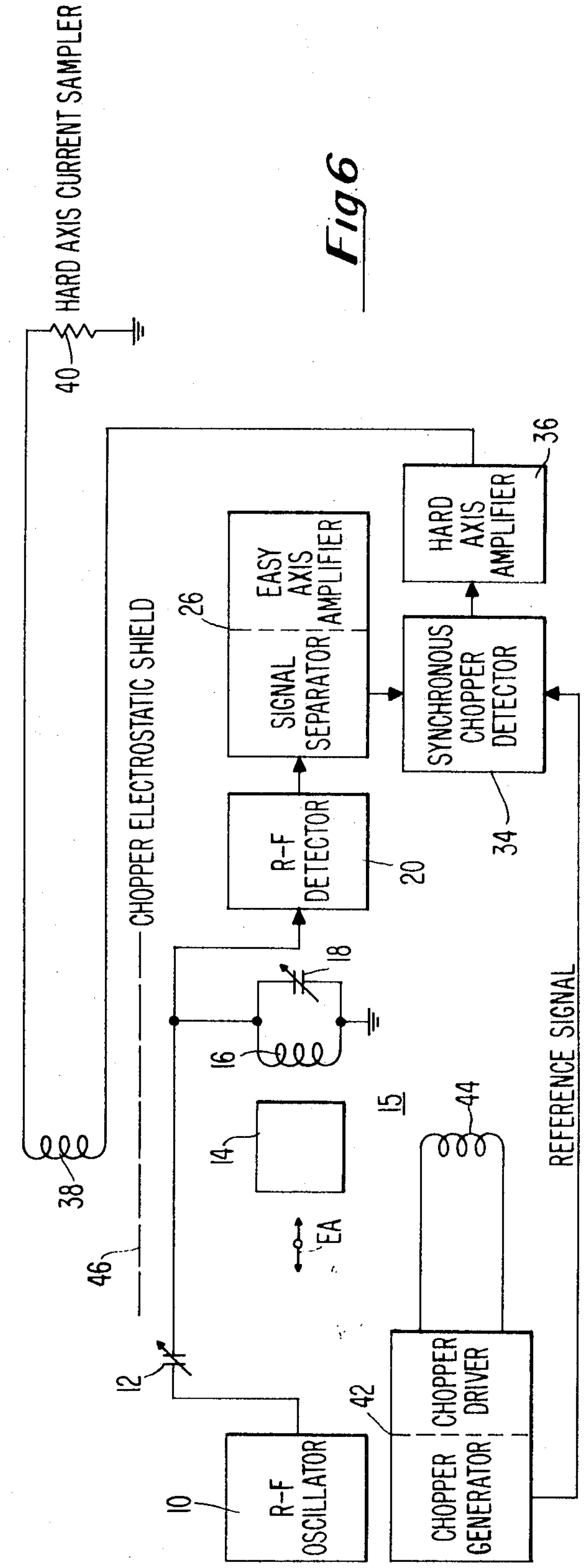
FIG. 6, which is derived from FIG. 4, depicts only those components which make up the hard axis channel.

The operation of the hard axis channel will next be considered with the aid of FIG. 6. For design purposes the signal transmission characteristics of the channel can be considered in three parts. The first part concerns the chopper frequency section commencing with the hard axis field input and ending at the output of the Synchronous Detector 34. The second part involves the path from the signal frequency portion of the Synchronous Detector 34 to the output of the Hard Axis Amplifier 36. The third part is the hard axis feedback network comprising the hard axis feedback coils 38 and current sampling resistor 40 combination.

The RF voltage impressed across the tank circuit thin film element by the RF Oscillator 10 is modulated by the easy axis field environment and the chopper field which is itself modulated by hard axis signals. The modulated RF voltage is detected in RF Detector 20 and the resulting complex signal involving both hard and easy axis information is applied to the Signal Separator/Easy Axis Amplifier 26. In performing its separation or splitting function, the Signal Separator section substantially eliminates the hard axis chopper frequency from the complex information and passes the easy axis information into the succeeding Easy Axis Amplifier stages. The Signal Separator also directs the complex information to the Synchronous Chopper Detector 34 which includes in its input stage a filter section for removing the easy axis signal components present in the information. This allows the hard axis modulated chopper information to pass into the Chopper Detector.

The Synchronous Chopper Detector 34 which receives a reference signal from the Chopper Generator section of block 42 demodulates the hard axis information producing an output proportional to the information as described hereinbefore in connection with FIG. 2. The Synchronous Detector 34 output, which is at the hard axis signal frequency, is applied to the Hard Axis Amplifier 36 which is an operational amplifier. The voltage output of this Amplifier causes feedback current to flow through the series combination of the hard axis feedback coils 38 and a resistor 40 which serves as the hard axis current sampler. The hard axis feedback coils 38 are a solenoid having its coil axis transverse to the preferred direction of magnetization of the thin film element 14. Current flowing through the hard axis feedback coils generates a hard axis magnetic field which is of the proper magnitude and polarity to cancel out the hard axis signal component of the external field environment. The voltage appearing across resistor 40 corresponds to the hard axis signal component and in a sensitive two-axis magnetometer may be utilized in conjunction with the voltage across the easy axis current sampling resistor 30 (FIG. 5) to obtain independent concurrent measurements of the external easy and hard axis field components.

The Chopper Generator/Chopper Driver 42 produces the constant current square wave drive for the chopper coils 44 at the desired frequency and proper amplitude. In the design of the hard axis channel, the system requirements for magnitude and passband of hard axis rejection, and toleration of the ambient field are important considerations. Moreover, the minimization of the chopper frequency component in the easy axis channel output is essential.

The amplitude and frequency of the Chopper Generator/Chopper Driver 42 output are necessarily chosen on a compromise basis. Thus the chopper frequency should be as high as possible to minimize the chopper component in the easy axis channel output. On the other hand, practical considerations in the realization of the hard axis channel, such as the inductance of the chopper coils, the passband predictability and the phase shift of the Signal Separator and of the input circuits of the Synchronous Detector 34 limit the chopper frequency. Considering the amplitude of the chopper output, this should be as low as possible to minimize the chopper components in the easy axis channel output. However, since chopper conversion gain is directly related to chopper amplitude, higher amplitudes ease the hard axis channel design.

The Synchronous Detector 34 must detect the chopper signal efficiently but must minimize the chopper frequency input into the Hard Axis Amplifier 36 because of the problems of amplifier saturation due to the residual noise in the detector output.

A chopper frequency electrostatic and magnetic shield indicated by the dashed line 46 is employed around the hard axis feedback coils 38 to reduce any chopper component in the Hard Axis Amplifier 36 which would tend to null the chopper generator field and thereby reduce the conversion gain of the chopper system.

Figure 7A:
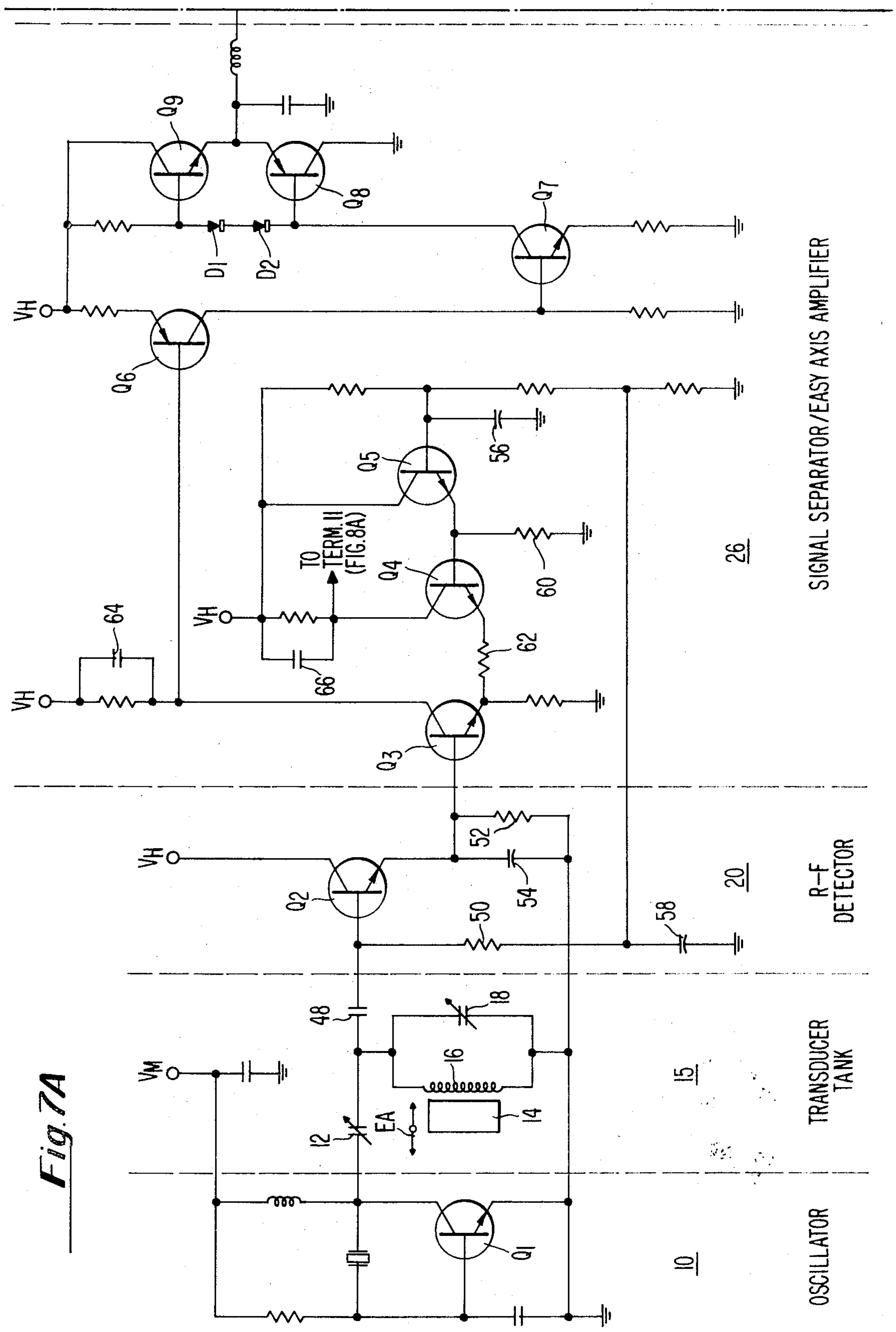
FIGS. 7*a* and 7*b*, taken together, illustrate an electrical schematic of the easy axis channel depicting by way of example, representative circuits for implementing the blocks of FIG. 5.
Figures 7, 7B:
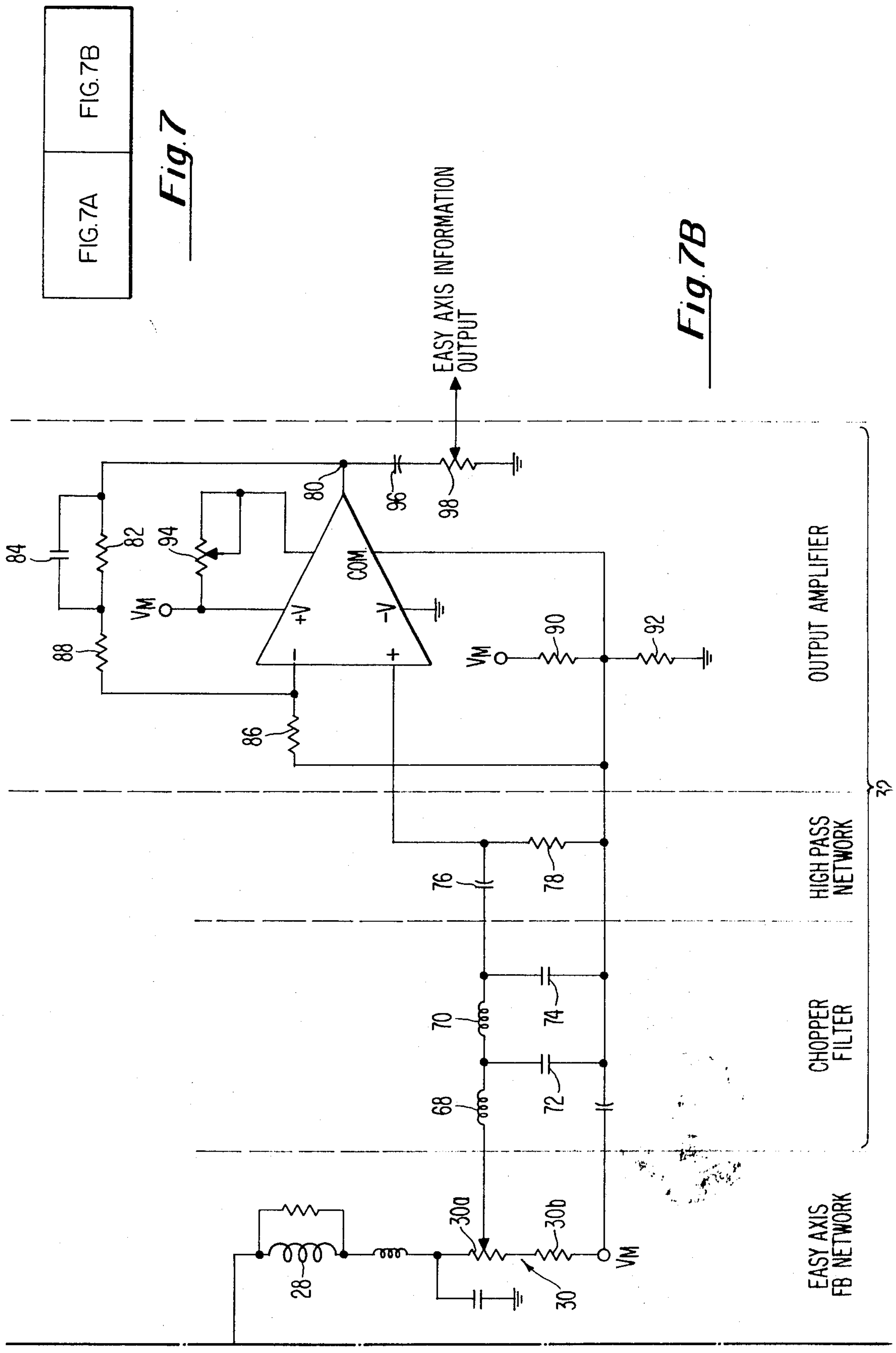
FIG. 7 illustrates the arrangement of FIGS. 7*a* and 7*b*.
Figure 8B:
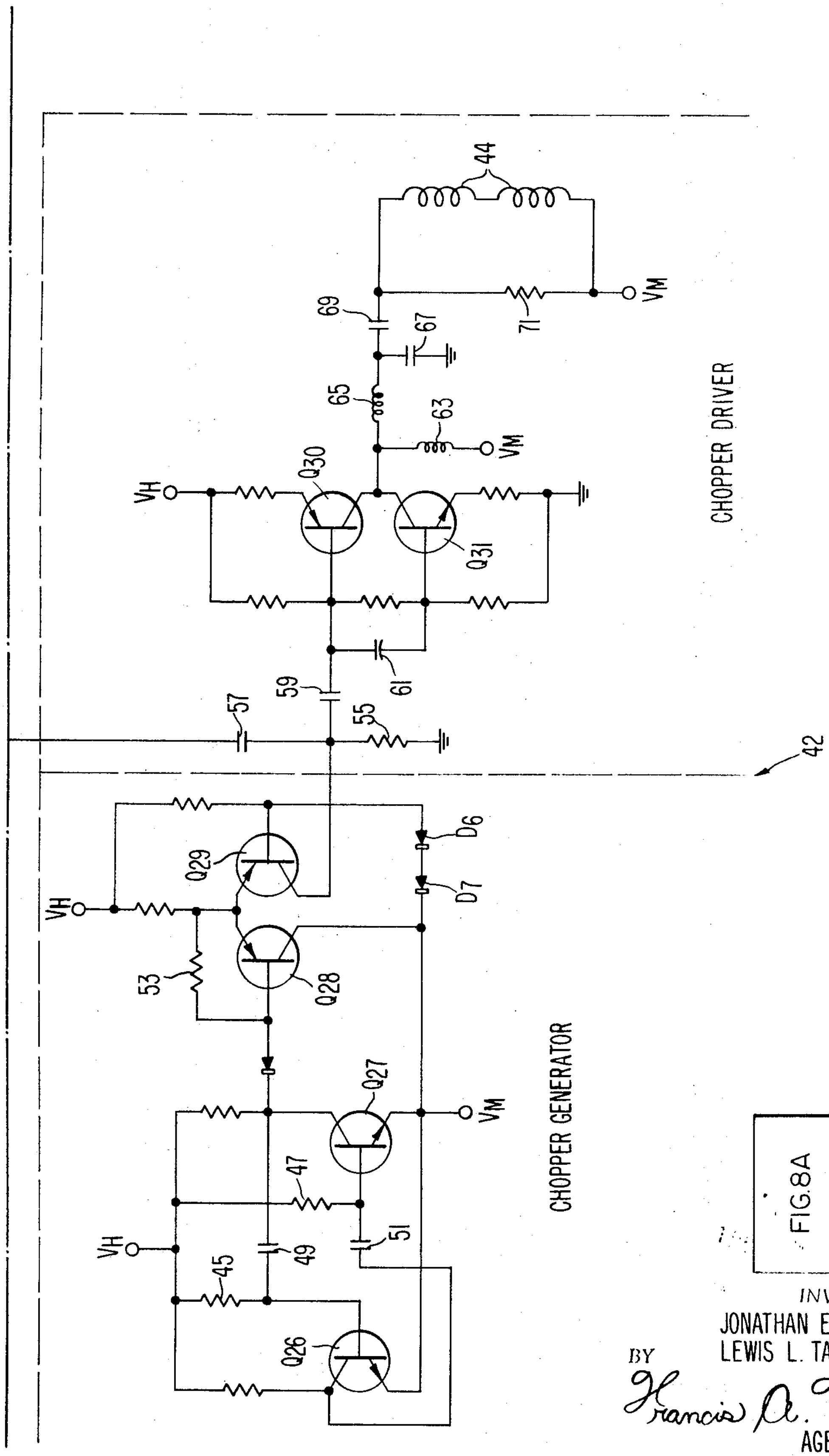
FIGS. 8*a* and 8*b*, taken together, constitute an electrical schematic of the hard axis channel depicting by way of example, representative circuits for implementing the blocks of FIG. 6.
Figure 8:
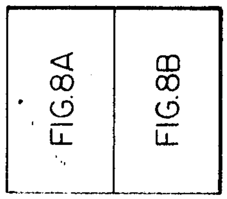
FIG. 8 illustrates the arrangement of FIGS. 8*a* and 8*b*.

FIGS. 7 and 8 present the circuit configuration employed respectively in the easy and hard axis channels of an actual operative embodiment of the present invention. It should be emphasized that these circuits and the parameters associated therewith have been included solely for purpose of example, and are not to be construed as limiting the invention. Modifications of these circuits, or the substitution of different circuits capable of performing the same functions, are well within the skill of the circuit designer and these circuits may be satisfactorily employed in the practice of the invention.

With reference to FIG. 7, the basic magnetometer sensor comprises the RF Oscillator 10, the Transducer Tank circuit 15 and the RF Detector 20. This is the slope-detection circuit described and claimed in the referenced U.S. Pat. No. 3,443,213.

The RF Oscillator 10 incorporating transistor $Q_1$ and operating at approximately 11 mHz., is crystal controlled and of the Pierce variety. The oscillator peak voltage output is essentially the value of its supply voltage, $V_M$. The desired amplitude of RF tank current drive is provided by the variable capacitor 12, which adjustment also serves as the Easy Axis Amplifier DC balance adjustment. A tank tuning adjustment is provided by variable capacitor 18 to allow for initial tuning.

The voltage appearing on the tank circuit is coupled to the RF Detector 20 through capacitor 48. This capacitor in combination with resistor 50 provides a voltage gain pole at the RC frequency of approximately 300 kHz. which is intentionally much removed above the highest frequency signal to be passed, namely the modulated chopper signal. Resistor 50 serves to diminish the otherwise high Q characteristic of the tank circuit.

Transistor $Q_2$ of the RF Detector 20 is a voltage follower which detects the peak of the RF voltage. The emitter resistor 52 provides a discharge path for the filter capacitor 54. The filter acts as a pole of frequency approximately 44 kHz. This pole will attenuate somewhat the transmission of the chopper signal, but its use is essential in order that the 11 mHz. oscillator frequency be removed.

Next in considering the design of the easy axis channel of FIG. 7, two parameters are important, namely (a) the conditions that guarantee protection against amplifier latchup due to magnetic signals that exceed the linear operation range of the channel and, (b) the easy axis sensitivity as measured at the RF Detector 20 output.

With regard to the former parameter, examination of the easy axis channel indicates that to prevent latchup, the Easy Axis Amplifier linear output drive capability must be incapable of reversing the polarity of the RF Detector 20 output with respect to the Easy Axis Amplifier reference voltage at its input, from that which caused the system to go nonlinear. If the polarity is allowed to reverse, the phase of the signal in the feedback loop when the excess field is removed produces positive feedback, thereby causing the amplifier to latch up.

The easy axis feedback network transfer function in terms of oersteds per volt can be established from knowledge of the maximum range of the amplifier output voltage and the maximum required linear range of operation for the system.

In order to ascertain the maximum positive and negative fields for linear operation of the channel, it is necessary to establish the maximum linear range of the Easy Axis Amplifier output voltage. This is done by utilizing the values of the DC supply voltages, $V_M$ and $V_H$, used in the amplifier, which in an actual operative embodiment are respectively 5.4 and 10.8 volts. Since the amplifier will be required to handle a predetermined range of magnetic fields, the voltage sensitivity of the sensor to easy axis signals is chosen on this basis. A practical easy axis feedback coil capable of providing the required sensitivity is then employed, and the value of the sampling resistance is determined. The maximum amplifier linear drive capability in terms of magnetic fields in respective positive and negative directions is then calculated. These calculated values are then used in the determination of the Q of the transducer tank circuit. A Q of 13.3 has been determined experimentally to be a satisfactory nominal value while providing an adequate margin for circuit parameter variations.

The sensitivity of the sensor is dictated by the conditions that must be satisfied to meet the requirement to prevent system latchup and is defined as the voltage per oersted of applied easy axis field measured at the RF detector output with the feedback loop open.

The next step in the easy axis channel design is the determination of the easy axis amplifier gain, based upon the sensitivity at the RF detector output and the easy axis feedback network sensitivity as well as the required channel performance.

The nominal design gain of the easy axis amplifier is determined from the qualitative consideration of easy axis system gain margin. The higher the gain margin, the lower will be the amplitude of the easy axis magnetic signal component information in the hard axis output of the signal separator portion of the easy axis amplifier. This condition minimizes electrical crosstalk between the easy axis and hard axis channels. Moreover, the relative amplitudes of both the cross-modulation products and the intermodulation products for signals within each channel as well as between the channels is reduced as gain margin is increased.

In addition, the higher the gain margin the higher is the amplifier output impedance and the more closely the system approximates a current drive to the easy axis feedback network, reducing the effects of voltages induced in the feedback windings from external magnetic fields. Additional gain margin is also designed into the channel, to allow the amplifier gain degradation with temperature and age.

In accordance with the foregoing design considerations for the easy axis channel, the Signal Separator/Easy Axis Amplifier 26, and the Chopper Filter/Output Amplifier 32 may be constructed as illustrated in FIG. 7.

The Signal Separator/Easy Axis Amplifier 26 of FIG. 7A comprises an input section including first and second gain stages. The first stage includes transistors $Q_3$, $Q_4$, and $Q_5$; second stage, transistor $Q_6$. The output section of the amplifier includes a third gain stage comprising transistor $Q_7$, and an output stage having transistors $Q_8$ and $Q_9$.

The complex signal appearing on the emitter electrode of transistor $Q_2$ in the RF Detector 20 is made up of the easy axis signal having a frequency range from DC to 16 kHz. and the hard axis chopper voltage of approximately 80 kHz. modulated by the hard axis signal. This complex signal is applied to transistor $Q_3$ of the Signal Separator/Easy Axis Amplifier 26. The reference voltage for this first stage appears on the base of transistor $Q_4$. Capacitors 56 and 58 provide signal bypassing. Resistors 52 and 60 ensure that the respective transistors $Q_2$ and $Q_5$ are properly biased. The emitter resistor 62 which may be of the order of 100 ohms is included to reduce the dependence of the gain of the stage on the temperature sensitive internal emitter impedances of transistors $Q_3$ and $Q_4$.

The signal separator action of the amplifier results from the availability of the signal voltages appearing respectively on the collector electrodes of transistors $Q_3$ and $Q_4$. Capacitor 64 in the collector circuit of transistor $Q_3$ is of the order of 0.1 mfd. and provides a bypass for the chopper frequency components of the complex signal. The signal applied to the base of transistor $Q_6$, the second stage of easy axis amplification, consists principally of easy axis information, along with a small residual chopper component not filtered by capacitor 64. On the other hand, the complex signal appearing on the collector of transistor $Q_4$ is relatively unaffected by capacitor 66 which is 100 pfd., and is applied to the hard axis channel input buffer stage of the Synchronous Chopper Detector 34, illustrated in FIG. 8A.

The easy axis signal applied to the base of transistor $Q_6$ is amplified thereby and the signal appearing on its collector is in turn applied to the base of transistor $Q_7$. The amplitude of the current flow in the collector circuit of this last transistor is chosen such that the voltage drop across diodes $D_1$ and $D_2$ will produce satisfactory bias conditions for transistors $Q_8$ and $Q_9$. The Easy Axis Amplifier output voltage appears on the common emitters of transistors $Q_8$ and $Q_9$, and is applied to the easy axis feedback network shown in FIG. 7B. The latter network includes the easy axis feedback coil 28 and the easy axis current sampler 30 which is comprised of variable resistor **30*a* and fixed resistance 30*b*. Current flow through the easy axis feedback coil 28 tends to null out the applied easy axis magnetic field component, while the polarity and amplitude of the voltage across the current sampler 30 is indicative of the magnitude and direction of the applied field. This last voltage is applied to the succeeding Chopper Filter/Output Amplifier 32 of FIG. 7B** which provides the easy axis information output.

More specifically, the voltages appearing at the current sampler 30 are applied to a series Chopper Filter and a feedback controlled Output Amplifier that provides the required gain and shapes the band-pass of the easy axis channel output signal. The Output Amplifier also provides the required output impedance. It is a system requirement that the signals of chopper frequency appearing in the output signal be negligible compared to the inherent system electrical noise. The Chopper Filter comprises two cascaded LC low pass filters which will greatly attenuate the residual signals of chopper frequency appearing on the easy axis information. The values of inductors 68 and 70 and capacitors 72 and 74 are chosen to be compatible with the high pass signal frequency filter network comprised of capacitor 76 and resistor 78 following the chopper filter and also with the input source impedance. In a practical system, a corner frequency of 10 kHz. was found to be satisfactory for the filters.

The output of the high pass network is applied to the Output Amplifier which is of the operational type. The amplifier configuration depicted in FIG. 7B is a feedback type voltage follower with gain. In practice, a voltage gain of 200 measured from the (+) noninverting input terminal to the amplifier output terminal 80 has been realized. The upper cutoff frequency is determined by the parallel combination of resistor 82 and capacitor 84. The divider formed by resistors 86 and 88 in the amplifier feedback network provides increased gain margin at high frequencies. Resistors 90 and 92 form a divider from the supply potential $V_M$ to ground and provide a voltage reference for the amplifier. Variable resistor 94 enables the cancellation of any input offset in the amplifier. Capacitor 96 couples the amplifier output to the adjustable output attenuator 98, which provides the system output from the easy axis channel.

FIG. 8 illustrates practical circuit configurations for the hard axis channel. The individual circuits making up this channel include the Chopper Synchronous Detector 34 with an input buffer stage, a Hard Axis Amplifier 36 similar to the Easy Axis Amplifier described hereinbefore, the hard axis feedback network and the Chopper Generator/Chopper Driver 42.

Considering the overall design of the hard axis channel, the factors to be considered are chopper frequency and amplitude, hard axis amplifier gain and hard axis feedback sensitivity.

Regarding the chopper frequency, 80 kHz. has been employed successfully. This frequency is high enough to allow the chopper frequency component at the output of the Easy Axis Amplifier to be filtered adequately in the Chopper Filter, but not so high that phase shift problems are encountered in the thin film transducer, the RF Detector and the Signal Separator. Also at this frequency, it is practical to use chopper windings or coils having reasonable inductance values, thereby allowing acceptable dissipation in the Chopper Driver. Another important consideration is that the frequency must be high enough that the Hard Axis Amplifier cannot pass the chopper component and through negative feedback, reduce or seriously change the chopper amplitude and phase at the transducer, thereby introducing stability problems.

The aforementioned choice of chopper frequency also allows the use of field effect transistors (FET's) in the Synchronous Detector with attendant advantages, such as zero offset voltage, over the use of bipolar transistors.

The chopper signal amplitude must be high enough to provide adequate conversion gain and thus acceptable signal to noise ratio to the Hard Axis Amplifier. Conversion gain in volts per oersted may be defined as the ratio of the differential voltage output of the Synchronous Chopper Detector to the applied hard axis field in oersteds. The actual conversion gain measured at the output of the Synchronous Detector differs from the theoretical value because the electrostatic shield 46 employed to reduce capacitive coupling of the chopper signal to the Easy Axis Amplifier attenuates the field produced by the chopper coils 44. Moreover, the field produced by the coils is not an ideal square wave, which is assumed in theoretical considerations; and finally, the chopper Detector 34 is not perfectly efficient. Expressed mathematically, the practical conversion gain $T_{CGP}$ measured at the Chopper Detector output can be represented as $$T_{CGP}=0.69\ K\ H_c G_S \quad (16)$$

Where 0.69 is the coefficient in a practical embodiment and $K$ is the empirically determined cumulative effect of the above factors, $H_c$ is the peak amplitude of the chopper field and $G_S$ is the voltage gain of the Signal Separator stage at the chopper frequency. In a practical embodiment a chopper field amplitude of ±0.125 oersted produced a $T_{CGP}$ of 0.14 volts/oersted.

The chopper coils 44 which are inductively coupled to the thin film element 14 and have their coil axes oriented parallel with the film hard axis are arranged in a Helmholtzlike configuration. This arrangement minimizes the chopper field introduced on the easy axis.

The hard axis feedback network transfer function is then determined in the same manner as was the easy axis case. A practical hard axis feedback coil or winding 38 employs two identical coils arranged in a Helmholtzlike configuration. Thus the field generated by the hard axis feedback coils 38 exhibits minimal coupling to the easy axis channel, and stability problems due to interchannel coupling are thereby avoided.

In the design of the hard Axis Amplifier 36, it is noted that the output stage is substantially the same as that used in the Easy Axis Amplifier, except for the substitution of a transistor of opposite conductivity type. Therefore the linear output voltage range will be the same as that determined for the easy axis amplifier.

Figure 8A:
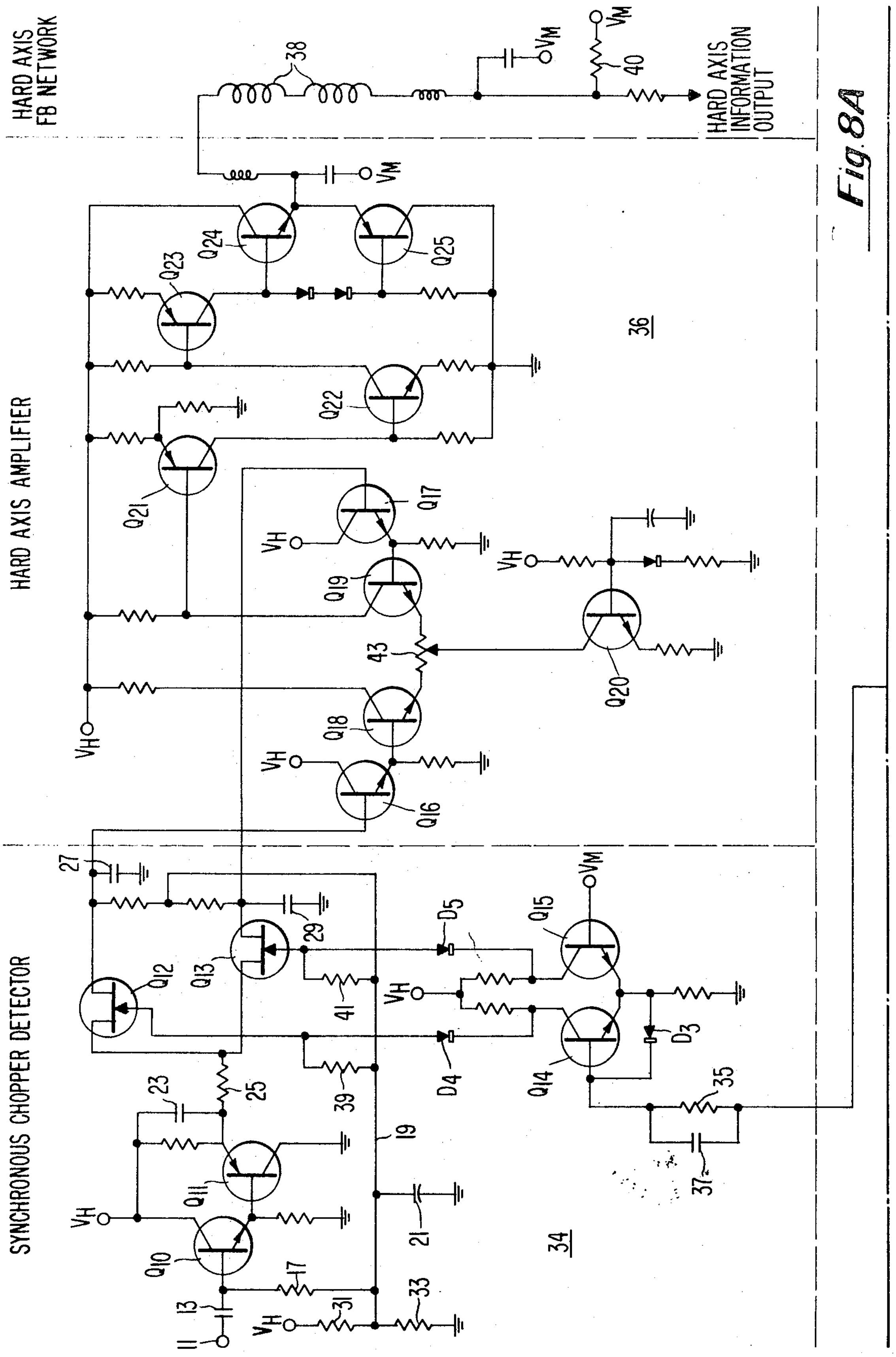

With continued reference to FIGS. 7 and 8, the signal appearing on the collector electrode of transistor $Q_4$ (FIG. 7A) is applied to terminal 11 of the input buffer section of the Synchronous Chopper Detector 34 (FIG. 8A). The high-pass filter comprised of capacitor 13 and resistor 17 in the input buffer serves to pass the modulated chopper signal to the chopper detector with minimum attenuation, while rejecting the easy axis signal information. The output of this filter is applied to the base of transistor $Q_{10}$ which together with transistor $Q_{11}$ form cascaded emitter followers. The respective collector current values of transistors $Q_{10}$ and $Q_{11}$ are relatively close in amplitude so that the base to emitter voltage drops are substantially cancelled. This effect reduces the offset from the reference voltage bus 19 and eliminates temperature dependence. Capacitor 21 serves as a filter capacitor on the reference voltage bus, while capacitor 23 reduces the tendency of the cascaded emitter followers to oscillate.

The signal appearing on the emitter of transistor $Q_{11}$ is coupled by way of resistor 25 to both of the FET's identified respectively be reference numerals $Q_{12}$ and $Q_{13}$. The most important consideration in the design of the Chopper Detector is the reduction of the chopper signal amplitude in the output of the detector, since the hard axis high gain amplifier which follows could be easily saturated by chopper-frequency noise. The chopper frequency component across the filter capacitors 27 and 29 arises principally from two sources. The first of these is due to a difference of potential in the DC reference level on which the input signal is superimposed and the potential to which the capacitors are referenced. This condition may be eliminated by ensuring that the filter DC reference is at the same potential as that around which the input modulated chopper signal is swinging. This is guaranteed by the use of the voltage bus at the midpoint of resistors 31 and 33.

The second contribution to chopper frequency components across the output filters is due to the switching signal at the chopper frequency on the FET gates, and appearing at the output as a result of the divider circuit formed by the FET gate-to-drain capacity and the output filter capacitor. This effect may be minimized by maximizing the ratio of output filter capacity to FET gate-to-drain capacity.

The drive signals for the FET's $Q_{12}$ and $Q_{13}$ are provided by a differential switch comprising transistors $Q_{14}$ and $Q_{15}$. Transistor $Q_{14}$ receives on its base a reference signal from the Chopper Generator of FIG. 8B (which will be described hereinafter) while the base of transistor $Q_{15}$ is coupled to a DC reference level corresponding to $V_M$. At any given time, the voltage appearing on the collector electrode of either transistor $Q_{14}$ or $Q_{15}$ is applied to the base electrode of the FET associated therewith. Diode $D_3$ ensures that the drive to the differential switch from the chopper generator does not exceed the reverse breakdown of the base-emitter junction of transistor $Q_{14}$. Resistor 35 provides an adequate base drive for transistor $Q_{14}$, while capacitor 37 connected in parallel therewith functions as a speedup capacitance.

Considering the circuit conditions for establishing the conduction of either of the FET's, it is observed that a FET is "ON" when the collector electrode of the nonconducting transistor in the differential switch is at the $V_H$ supply potential. Thus the source, drain and gate electrodes of the "ON" FET are all at the reference potential.

The minimum gate-to-source voltage on the FET in the "OFF" condition is a function of the reference potential established by the supply potential $V_H$ and divider resistors 31 and 33 minus the collector voltage on the "ON" switch driver transistor ($Q_{14}$ or $Q_{15}$) and the voltage drop across the associated diode $D_4$ and $D_5$ on the basis of respective current flow through resistors 39 or 41. The FET gate-to-source voltage is designed to be somewhat larger than the specified "pinch-off" voltage for the FET, thereby guaranteeing that the device will be "OFF."

With continued reference to FIG. 8A, the output signals appearing respectively on the drain electrodes of FET $Q_{12}$ and FET $Q_{13}$ of the Synchronous Detector are applied to the respective base electrodes of transistors $Q_{16}$ and $Q_{17}$ connected as emitter followers in the input stage of the Hard Axis Amplifier 36. The configuration of the Hard Axis Amplifier is similar to that of the Easy Axis Amplifier except for the addition of an extra stage of gain. The buffered differential input stage which includes transistors $Q_{18}$ and $Q_{19}$ is similar to that used in the Easy Axis Amplifier, except that the common emitter resistor in the latter, has been replaced by a current source comprising transistor $Q_{20}$. This has been done to improve the common mode rejection of the stage so as to reject any common mode chopper signal out of the Chopper Detector 34.

Since the current in the differential pair of transistors $Q_{18}$ and $Q_{19}$ is the same as in the Easy Axis Amplifier, the voltage gain of the pair is very close to that of the easy axis amplifier pair. In an actual operative embodiment, an approximate gain of 10 was provided by the pair.

Potentiometer 43 coupled between the emitters of transistors $Q_{18}$ and $Q_{19}$ provides for a range of voltage offsets for compensating for any mismatch between the halves of the buffered differential pair and for deviations from design values internal to the amplifier. It also provides for compensation of offsets in the output of the Synchronous Chopper Detector 34.

Transistor $Q_{21}$ forms a second amplifier stage, providing in an actual embodiment, a gain of 7.2.

Transistor $Q_{22}$ is a third amplifier stage not found in the easy axis amplifier and providing a gain of approximately 6.5.

Finally the output configuration of the section comprising a fourth gain stage transistor $Q_{23}$ and an output stage including transistors $Q_{24}$ and $Q_{25}$ is the same as that used in the Easy Axis Amplifier output section, except that transistor $Q_{23}$ (FIG. 8A) and transistor $Q_7$ (FIG. 7A) are of opposite conductivity types. The gain of this output section in either the easy or hard axis channel is 16.

The total amplifier gain of the hard axis amplifier, in the above-mentioned embodiment is the product of the stage gains, or approximately 7,500.

The Hard Axis Amplifier 36 output signal appearing on the common emitters of transistors $Q_{24}$ and $Q_{25}$ cause feedback current to flow through the coils 38 and the hard axis current sampling resistor 40. As noted hereinbefore, the feedback coils 38 are inductively coupled to thin film transducer 14 and are physically positioned to apply a hard axis nulling field to the film. The nulling field is of the proper polarity and magnitude to effectively cancel the hard axis magnetic field environment to which the transducer is subjected. If desired, the amplitude and polarity of the voltage appearing across resistor 40 may be monitored to obtain a representation of the magnitude and direction of the sensed hard axis field components.

FIG. 8B further illustrates the circuit configuration of the Chopper Generator/Chopper Driver 42 and the chopper coil network including chopper coils 44.

The Chopper Generator is a conventional astable multivibrator with the base circuit impedances 45 and 47 of its active elements, transistors $Q_{26}$ and $Q_{27}$, unbalanced to serve two functions. First, the unbalance ensures the starting of the multivibrator when power is applied to the circuit; second, it makes the time of the two phases of the output of the current switch, transistors $Q_{28}$ and $Q_{29}$, equal.

The capacitance value of the coupling capacitors 49 and 51 which may be each of the order of 470 pfd. is a compromise that simultaneously allows the output waveform to exhibit a reasonably fast rise-time and yet is large enough to ensure adequate charge storage to allow starting of the multivibrator with the application of power.

The value of resistors 45 and 47 which respectively couple the base electrodes of transistors $Q_{26}$ and $Q_{27}$ to the supply potential $V_H$, are chosen to produce a symmetrical output from the current switch. The function of the current switch transistors $Q_{28}$ and $Q_{29}$ is to further shape the multivibrator square output waveform. Series diodes $D_6$ and $D_7$ in the current switch provide a voltage reference to guarantee switching of the pair.

Resistor 53 connected between the emitter and base of transistor $Q_{28}$ ensures that the base-emitter reverse breakdown potential of the latter transistor is not exceeded when multivibrator transistor $Q_{27}$ is in the "OFF" state. The output of the current switch develops a voltage across resistor 55 which in an operating circuit was approximately 1.6 volts peak-to-peak. This square wave is applied by way of capacitor 57 and the coupling network, resistor 35 and capacitor 37 to the base of transistor $Q_{14}$ of the differential switch (FIG. 8A) and provides the reference frequency for the Synchronous Chopper Detector 34.

The Chopper Driver depicted in FIG. 8B is a bipolar current driver which utilizes a pair of transistors $Q_{30}$ and $Q_{31}$. The input signal developed across resistor 55 by the switch circuit of the Chopper Generator is coupled to the base of transistor $Q_{30}$ by capacitor 59 and by way of capacitor 61 to the base of transistor $Q_{31}$. The peak-to-peak current developed in each of the last mentioned transistors is substantially equal, and the total peak-to-peak collector current, which flows through the chopper coils 44, is approximately 5.7 ma. in an actual operating circuit. Inductor 63 provides a DC return path for any difference current in the quiescent states of transistors $Q_{30}$ and $Q_{31}$. Inductor 65 and capacitor 67 form a low pass filter section, having a cutoff frequency on the order of 1 mHz. The purpose of the filter is to greatly attenuate the high frequencies present in the chopper driver output, thereby eliminating possible beat frequencies derived from the RF oscillator frequency and the chopper harmonics in the system passband. Capacitor 69 couples the output of the driver to the chopper coils 44, while resistor 71 serves to damp unwanted oscillations in the chopper coils.

In conclusion, it has been verified experimentally that the magnetometer system described herein is very effective in substantially reducing or eliminating the response of the thin film transducer to hard axis field components in those applications requiring precise easy axis field sensitivity. At the same time, it is apparent that the system provides an orthogonal two-axis sensor for use in applications requiring independent signal outputs representative of the respective external magnetic field components directed along the axes.

What is claimed is:

1. A magnetometer system including a transducer comprised of ferromagnetic material capable of assuming opposed states of residual flux density along its easy axis of magnetization, said material being initially magnetized substantially in a predetermined one of said states and existing substantially as a single large domain of said predetermined state, said transducer further comprising winding means inductively coupled to said material, the inductance value of said transducer being dependent upon the response of the transducer to an external magnetic field environment which includes field components directed respectively along the easy and hard axes of magnetization of said material, means coupled to said transducer for cyclically applying chopper magnetic fields to said material directed along the hard axis thereof, said chopper fields being modulated by the hard axis field components present in said external environment, means operatively connected to said transducer for sensing said inductance value and for providing a transducer output signal containing easy axis field component information as well as modulated chopper field signals containing hard axis field component information, said means for sensing said inductance value being of such a nature that the magnetization of said material is disturbed but not permanently altered in state, signal separator means operatively connected to receive said transducer output signal for separating said easy axis information from said modulated chopper signals, and detector means coupled to said signal separator means for removing said hard axis information from said modulated chopper signals, said magnetometer system thereby providing separate and distinct information representative of the magnetic field components directed along two orthogonal axes.

2. A magnetometer system as defined in claim 1 further characterized in that said ferromagnetic material is a thin film of nickel-iron alloy having a thickness of not more than 5,000 angstrom units.

3. A magnetometer system as defined in claim 1 further characterized in that said winding means includes a winding having its coil axis oriented parallel with the hard axis of magnetization of said material.

4. A magnetometer system as defined in claim 1 wherein said means for cyclically applying a chopper field to said material includes second winding means inductively coupled to said material, and a source of chopper current having a preselected repetition frequency, said second winding means being adapted to be energized from said source of chopper current, thereby generating the chopper magnetic fields applied to said material.

5. A magnetometer system as defined in claim 4 wherein said chopper current exhibits a square or rectangular waveform.

6. A magnetometer system comprising in combination at least one ferromagnetic thin film element capable of assuming opposed states of residual flux density along an easy direction of magnetization, said element being initially magnetized in a predetermined one of said states, said element acting substantially as a single large domain of said predetermined state, an inductor winding disposed about said element in such a manner as to link the thin film element magnetic flux in the hard direction of magnetization, capacitive means connected in parallel with said thin film element inductor winding and forming therewith a parallel resonant tank circuit, a source of radio frequency current, said tank circuit being adapted to be energized from said source of radio frequency current controlled in amplitude so as to limit the perturbation of the magnetization of said element to small angular rotations incapable of altering said single domain configuration, said film element and inductor winding comprising a transducer having a total inductance value dependent upon the external magnetic field environment to which said element is subjected, said external environment including magnetic field components directed respectively along the easy and hard directions of magnetization of said element, chopper winding means inductively coupled to said thin film element, a source of chopper current, said chopper winding means being adapted to be cyclically energized from said source of chopper current whereby hard direction chopper magnetic fields are applied to said element, the hard direction magnetic field components present in said external environment modulating said chopper fields, the relative amplitudes and phases of said modulated chopper fields being indicative of the magnitude and polarity of said hard direction magnetic field components, the radio frequency signals impressed across said tank circuit by said radio frequency current being modulated by the easy direction field components and the modulated hard direction chopper fields, radio frequency detector means coupled to said tank circuit for demodulating said radio frequency signals, the resulting output of said radio frequency detector containing easy direction field component information as well as modulated hard direction chopper field information, frequency-selective signal separator means operatively connected to receive the output of said radio frequency detector means for separating said easy direction information from said modulated chopper field information, and synchronous chopper detector means coupled to said signal separator means for demodulating the hard direction chopper field information.

7. A magnetometer system as defined in claim 6 further characterized in that said thin film element is a nickel-iron alloy composed substantially of 83 percent nickel and 17 percent iron, and having a thickness of approximately 2,000 angstrom units.

8. A magnetometer system as defined in claim 6 wherein said chopper winding means comprises a pair of windings inductively coupled to said film element and so disposed as to link the magnetic flux thereof in the hard direction of magnetization, said source of chopper current including a chopper signal generator and a chopper current driver, said chopper signal generator being coupled to said chopper current driver and providing a preselected repetition frequency for the operation thereof, said chopper driver being a bipolar current driver and being coupled to said pair of windings for causing chopper current flow therethrough at said repetition frequency whereby hard axis chopper magnetic fields are applied to said element.

9. A magnetometer system as defined in claim 8 wherein said chopper signal generator is an astable multivibrator having a square wave output, said preselected repetition frequency being of the order of 80 kHz.

10. A magnetometer system as defined in claim 6 further characterized in that said source of radio frequency current has a preselected fixed frequency, said parallel resonant tank circuit being detuned from resonance at said fixed frequency, the impedance magnitude of said tank circuit being a function of said total inductance value.

11. A magnetometer system as defined in claim 10 further characterized in that said source of radio frequency current comprises a transistor connected in a crystal controlled Pierce oscillator circuit having a fixed frequency of approximately 11 mHz.

12. A magnetometer system as defined in claim 6 further including means for applying a bias magnetic field to said thin film element directed along the easy direction of magnetization thereof.

13. A magnetometer system as defined in claim 6 wherein said synchronous chopper detector comprises an input high pass RC filter for passing the modulated chopper field information and rejecting the easy direction information, first and second transistors connected in a cascaded emitter follower configuration, a pair of field effect transistors each having source, drain and gate electrodes, means coupling the output signal of the cascaded emitter follower transistors in common to the respective source electrodes of said field effect transistors, third and fourth transistors connected in a differential switch configuration, means coupling the square wave output signal of said chopper generator to said differential switch transistors to control the operation thereof, while providing a reference signal of chopper generator frequency to said synchronous chopper detector, the output signals of said third and fourth transistors being applied respectively to the gate electrodes of said field effect transistors and causing each of said last mentioned transistors to alternately switch between conducting and nonconducting states, the demodulated hard direction chopper field information appearing on the drain electrodes of said field effect transistors.

14. A magnetometer system as defined in claim 6 further including separate easy axis and hard axis feedback networks, each of said networks including in series a feedback winding and a current sampling impedance, the easy axis and hard axis feedback windings being inductively coupled to said thin film element and being oriented to link the magnetic flux thereof respectively in the easy and hard directions of magnetization, easy and hard axis amplifier means, said easy axis amplifier means being operatively connected to said signal separator means for amplifying said easy direction information signals, the output of said easy axis amplifier means being applied to said easy axis feedback winding for causing current flow therethrough and generating a magnetic field directed along the easy direction of magnetization of said film element and opposed to the easy axis field component present in said external environment, the voltage appearing across the easy axis current sampling impedance in response to current flow through said easy axis feedback winding providing an indication of the magnitude and direction of said easy axis field component, said hard axis amplifier means being operatively connected to said synchronous chopper detector means for amplifying said hard direction information signals, the output of said hard axis amplifier means being applied to said hard axis feedback winding for causing current flow therethrough and generating a magnetic field directed along the hard direction of magnetization of said film element and opposed to the hard axis field component present in said external environment, the voltage appearing across the hard axis current sampling impedance in response to current flow through said hard axis feedback winding providing an indication of the magnitude and direction of said hard axis field component.

15. A magnetometer system as defined in claim 14 for providing a system output signal indicative of the easy axis component of the external magnetic field environment and in which the transducer response to the hard axis component of said environment has been effectively eliminated through the action of said hard axis feedback network, further including chopper filter means and an output amplifier, said chopper filter means being coupled to receive the easy axis information voltage appearing across said easy axis current sampling impedance and being comprised of low pass and high pass filter networks, said low pass filter network providing additional attenuation of residual signals at the chopper repetition frequency appearing in said easy axis information, said high pass filter network coupling the output of said low pass filter to said output amplifier, said output amplifier providing said system output signal.

16. A magnetometer system as defined in claim 14 further including a chopper frequency electrostatic and magnetic shield surrounding said hard axis feedback winding to minimize the coupling of electrical signal components of chopper frequency into the hard axis amplifier.

* * * * *